US012743651B2

(12) United States Patent
RV et al.

(10) Patent No.: US 12,743,651 B2
(45) Date of Patent: Sep. 22, 2026

(54) SYSTEM AND METHOD FOR MEMORY REALLOCATION FOR MICRO APPLICATIONS USING QUANTUM COMPUTING

(71) Applicant: Bank of America Corporation, Charlotte, NC (US)

(72) Inventors: Varshini RV, Madurai (IN); Thilagaraj Kannaiyan, Salem (IN); Madhav Vaidyanath, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 601 days.

(21) Appl. No.: 18/451,531

(22) Filed: Aug. 17, 2023

(65) Prior Publication Data

US 2025/0061367 A1 Feb. 20, 2025

(51) Int. Cl.
*G06N 10/60* (2022.01)
*G06N 10/40* (2022.01)

(52) U.S. Cl.
CPC ............. *G06N 10/60* (2022.01); *G06N 10/40* (2022.01)

(58) Field of Classification Search
CPC ........... G06N 10/60; G06N 10/40; G06N 5/01
See application file for complete search history.

(56) References Cited

U.S. PATENT DOCUMENTS

| | | | |
|---|---|---|---|
| 8,174,984 | B2 | 5/2012 | Tripathi et al. |
| 8,874,700 | B2 | 10/2014 | Chan et al. |
| 9,935,959 | B2 | 4/2018 | Keith et al. |
| 10,296,494 | B2 | 5/2019 | Davis et al. |
| 10,394,847 | B2 | 8/2019 | Stringham |
| 10,684,995 | B2 | 6/2020 | Chan et al. |
| 10,708,152 | B2 | 7/2020 | Kulshreshtha et al. |
| 11,106,560 | B2 | 8/2021 | Vijendra et al. |
| 11,354,058 | B2 | 6/2022 | Bernat et al. |
| 2016/0191677 | A1 | 6/2016 | Tompkins |
| 2016/0381087 | A1 | 12/2016 | Addepalli et al. |
| 2018/0159731 | A1 | 6/2018 | Murthy et al. |
| 2019/0123963 | A1 | 4/2019 | Tang et al. |
| 2021/0383878 | A1 | 12/2021 | Karr et al. |

FOREIGN PATENT DOCUMENTS

CN 104184819 A 12/2014

*Primary Examiner* — Kevin Verbrugge

(57) ABSTRACT

A method for memory reallocation for micro applications using quantum computing includes receiving logs for a micro applications server. A first score is determined based on the received logs. The first score is compared to a score threshold. In response to determining that memory reallocation is needed, the first score is compared to a plurality of scores. In response to the first score not matching any of the plurality of scores, a predicted memory configuration is determined based on the first score. An improved memory configuration is determined based on the predicted memory configuration. The improved memory configuration determines a respective memory allocation for micro applications hosted by the micro applications server. The improved memory configuration is deployed to the micro applications server. The micro applications server is restarted.

20 Claims, 3 Drawing Sheets

SYSTEM AND METHOD FOR MEMORY REALLOCATION FOR MICRO APPLICATIONS USING QUANTUM COMPUTING

TECHNICAL FIELD

The present disclosure relates generally to resource balancing, and more specifically to a system and method for memory reallocation for micro applications using quantum computing.

BACKGROUND

Application containerization is rapidly adopted by developers and allows the developers to manage and update containerized applications more easily. Even though containerization offers many advantages, developers struggle with memory allocation for containerized applications within a server (also referred to as a micro applications server) that hosts the containerized applications.

SUMMARY

The system described in the present disclosure provides several practical applications and technical advantages that overcome the current technical problems with resource balancing.

In general, a system for memory reallocation for micro applications using quantum computing comprises a resource balancing system operably coupled to a monitoring system, a micro applications server, and a load balancing system via a network. The monitoring system monitors various performance parameters of micro applications hosted by the micro applications server and generates logs for the micro applications server based on the monitored performance parameters. The resource balancing system receives the logs for the micro applications server from the monitoring system, determines a score based on the received logs, compares the score to a score threshold that is stored in the resource balancing system, and determines if memory reallocation is needed for the micro applications hosted by the micro applications server.

In response to determining the memory reallocation is not needed, the resource balancing system determines if an instruction to stop the memory allocation process is received. In response to determining the memory reallocation is needed, the resource balancing system compares the score to a plurality of scores that are stored in the resource balancing system and determines if the score matches with a store score among the plurality of stored scores.

In response to determining that the score matches with the stored score, the resource balancing system identifies a memory configuration corresponding to the stored score among a plurality of memory configurations that are stored in the resource balancing system, deploys the identified stored memory configuration to the micro applications server, and restarts the micro applications server.

In response to determining that the score does not match with the stored score, the resource balancing system determines a predicted memory configuration based on the score. In certain embodiments, the resource balancing system executes one or more classical algorithms while determining the predicted memory configuration. The one or more classical algorithms may comprise a random forest algorithm.

The resource balancing system determines an improved memory configuration based on the predicted memory configuration. In certain embodiments, the resource balancing system executes one or more quantum algorithms while determining the improved memory configuration. The one or more quantum algorithms may comprise a quantum optimization algorithm. The resource balancing system deploys the improved memory configuration to the micro applications server and restarts the micro applications server.

The resource balancing system determines if the memory reallocation process is successful. In response to determining that the memory reallocation process is not successful, the resource balancing system sends an instruction to the load balancing system to deploy the standard memory configuration to the micro applications server and restarts the micro applications server.

In response to determining that the memory reallocation process is successful, the resource balancing system stores the improved memory configuration along with the corresponding score in the resource balancing system and determines if an instruction to stop the memory allocation process is received. In certain embodiments, the resource balancing system performs the above-described operations of the memory allocation process one or more times until the instruction to stop the memory allocation process is received.

The system for memory reallocation for micro applications using quantum computing allows for monitoring various performance parameters of micro applications hosted by a micro applications server, determining a memory configuration for the micro applications on demand based on the monitored performance parameters, and reallocating memories of the micro application based on the determined memory configuration. By using a quantum optimization algorithm instead of a classical optimization algorithm, a speed of the memory reallocation process is improved due to the quantum parallelization. By employing the memory allocation process, memory utilization efficiency for the micro applications server is improved and downtime of the micro applications server is reduced or avoided.

Accordingly, the following disclosure is particularly integrated into practical applications of: (1) reallocating memories of micro applications hosted by a micro applications server on demand; (2) improving a speed of the memory reallocation process by using one or more quantum algorithms; and (3) improving memory utilization efficiency for a micro applications server.

In one embodiment, a system includes a resource balancing system communicatively coupled to a micro applications server. The resource balancing system includes a memory, a classical processor communicatively coupled to the memory, and a quantum processor communicatively coupled to the memory. The memory is configured to store a quantum optimization algorithm, a plurality of scores, a plurality of memory configurations corresponding to the plurality of scores, and a score threshold. Each memory configuration determining a respective memory allocation for micro applications hosted by the micro applications server. The classical processor is configured to receive logs for the micro applications server, determine a first score based on the received logs, and compare the first score to the score threshold. In response to determining that memory reallocation is needed, the classical processor is further configured to compare the first score to the plurality of scores. In response to the first score not matching any of the plurality of scores, the classical processor is further configured to determine a predicted memory configuration based on the first score and send the predicted memory configuration to a quantum processor. In response to sending the predicted memory configuration, the classical processor is further configured to receive an improved memory configuration from the quantum processor, deploy the improved memory configuration to the micro applications server, and restart the micro applications server. The quantum processor is configured to receive the predicted memory configuration from the classical processor, determine the improved memory configuration based on the predicted memory configuration, and send the improved memory configuration to the classical processor. The quantum processor implements the quantum optimization algorithm.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, where like reference numerals represent like parts.

DETAILED DESCRIPTION

Figure 1:
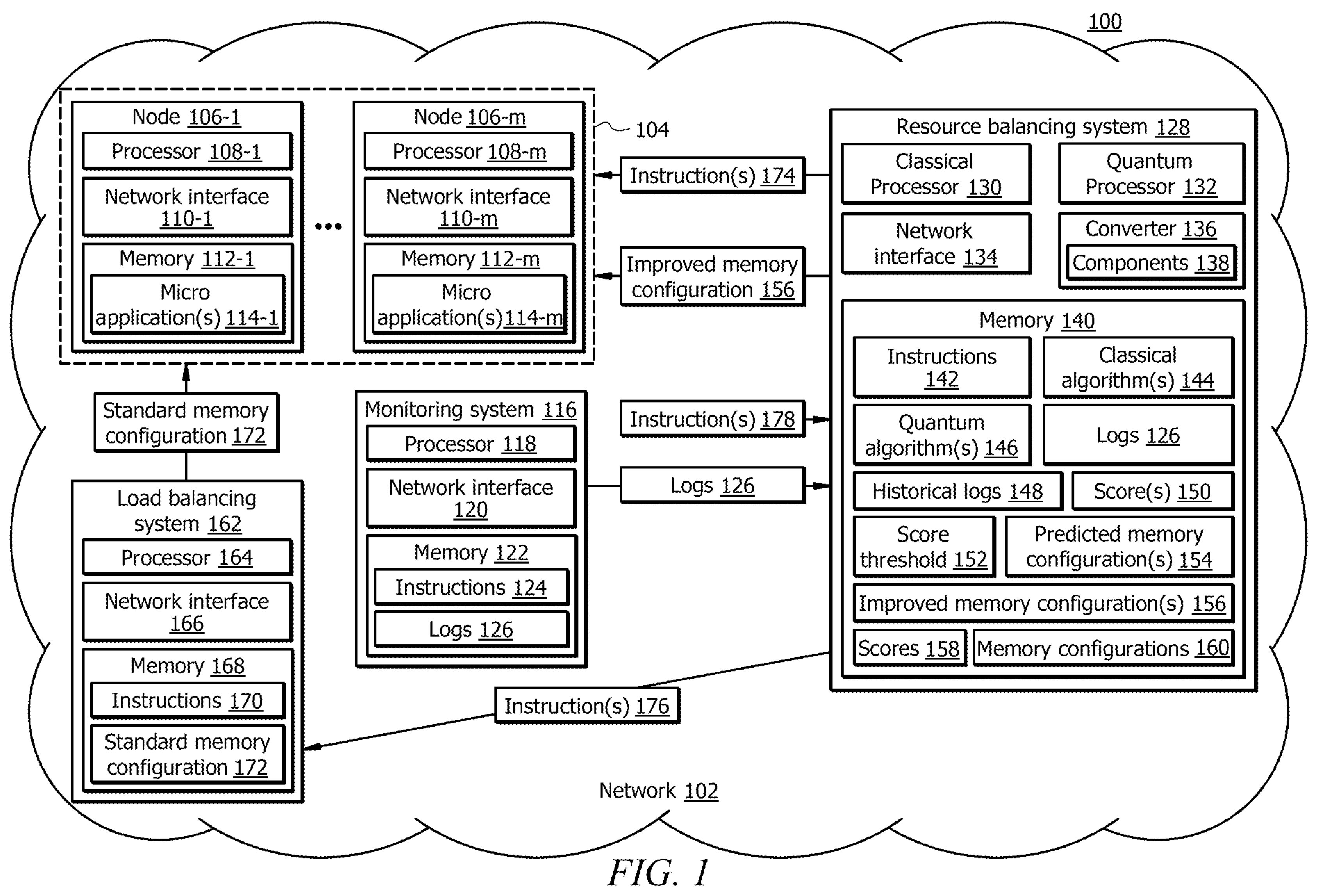
FIG. 1 illustrates an embodiment of a system for memory reallocation for micro applications using quantum computing.
Figure 2A:
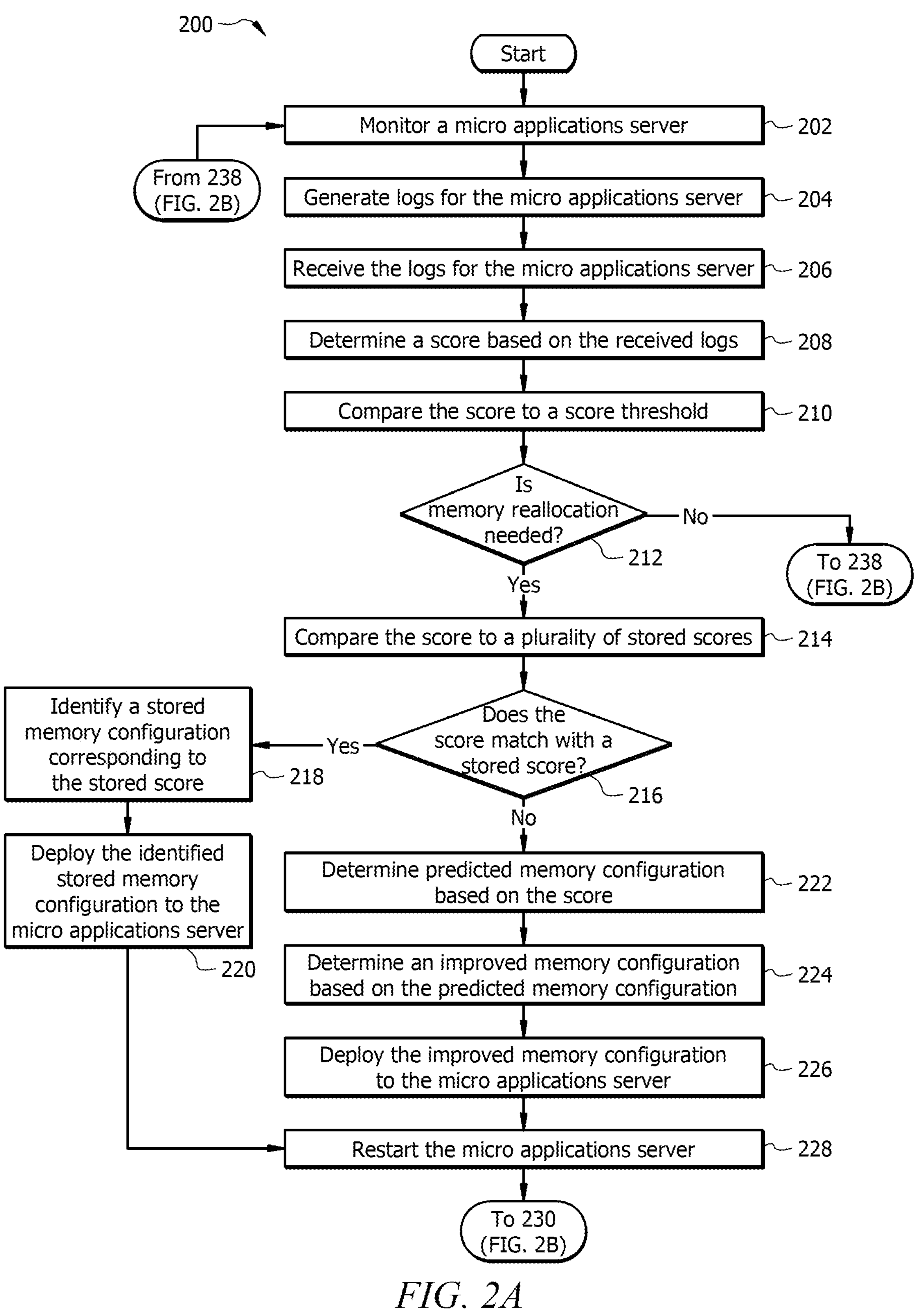
FIGS. 2A and 2B illustrate an example operational flow of system of FIG. 1 for memory reallocation for micro applications using quantum computing.
Figure 2B:
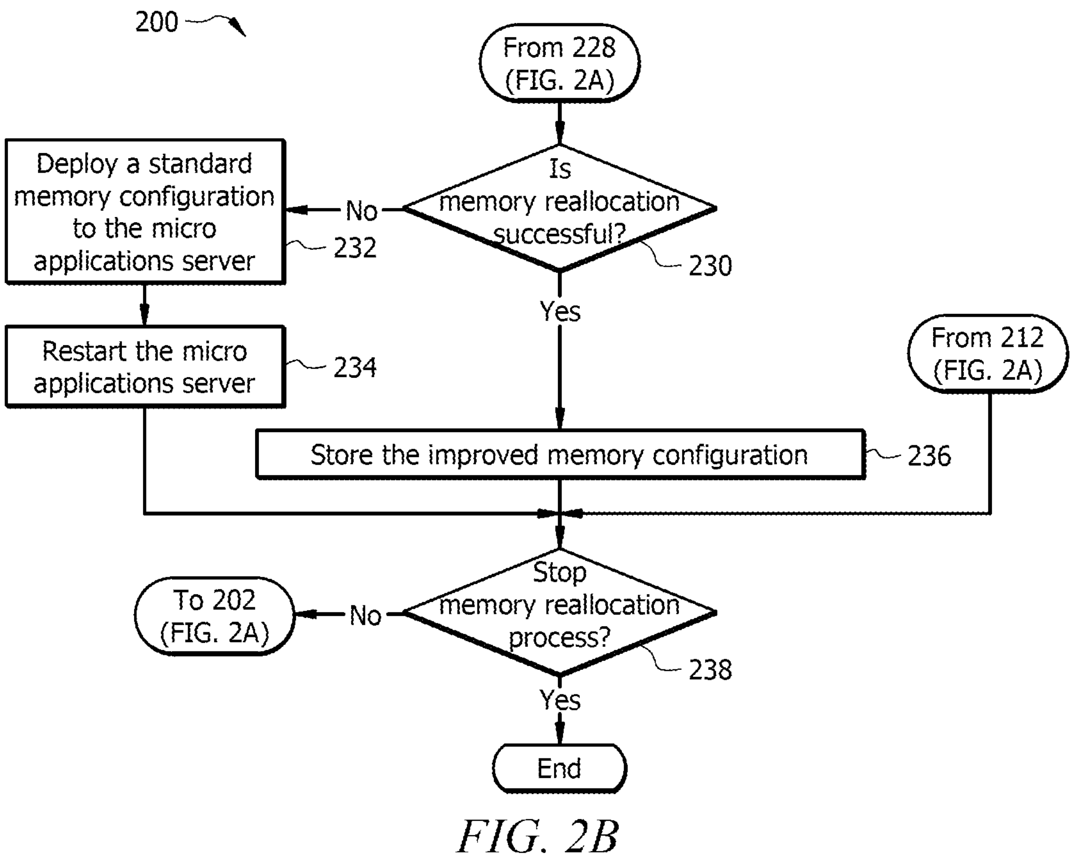

As described above, previous technologies fail to provide effective systems and methods for resource balancing. Embodiments of the present disclosure and their advantages may be understood by referring to FIGS. 1, 2A and 2B. FIGS. 1, 2A and 2B are used to describe a system and method for memory reallocation for micro applications using quantum computing.

System Overview

FIG. 1 illustrates an embodiment of a system 100 for memory reallocation for micro applications using quantum computing. In certain embodiments, the system 100 comprises a resource balancing system 128 operably coupled to a monitoring system 116, a micro applications server 104, and a load balancing system 162 via a network 102. Network 102 enables the communication between the components of the system 100. The micro applications server 104 comprises a plurality of nodes 106-1 through 106-*m*. In other embodiments, the system 100 may not have all the components listed and/or may have other elements instead of, or in addition to, those listed above.

In general, the monitoring system 116 monitors various performance parameters of micro applications 114-1 through 114-*m* hosted by the micro applications server 104 and generates logs 126 for the micro applications server 104 based on the monitored performance parameters. The resource balancing system 128 receives the logs 126 for the micro applications server 104 from the monitoring system 116, determines a score 150 based on the received logs 126, compares the score 150 to a score threshold 152 that is stored in the resource balancing system 128, and determines if memory reallocation is needed for the micro applications 114-1 through 114-*m* hosted by the micro applications server 104.

In response to determining the memory reallocation is not needed, the resource balancing system 128 determines if an instruction 178 to stop the memory allocation process is received. In response to determining the memory reallocation is needed, the resource balancing system 128 compares the score 150 to a plurality of scores 158 that are stored in the resource balancing system 128 and determines if the score 150 matches with a store score among the plurality of stored scores 158.

In response to determining that the score 150 matches with the stored score 158, the resource balancing system 128 identifies a memory configuration corresponding to the stored score 158 among a plurality of memory configurations 160 that are stored in the resource balancing system 128. The resource balancing system 128 deploys the identified stored memory configuration 160 to the micro applications server 104 and restarts the micro applications server 104.

In response to determining that the score 150 does not match with the stored score 158, the resource balancing system 128 determines a predicted memory configuration 154 based on the score 150. In certain embodiments, the resource balancing system 128 executes one or more classical algorithms 144 while determining the predicted memory configuration 154. The one or more classical algorithms 144 may comprise a random forest algorithm.

The resource balancing system 128 determines an improved memory configuration 156 based on the predicted memory configuration 154. In certain embodiments, the resource balancing system 128 executes one or more quantum algorithms 146 while determining the improved memory configuration 156. The one or more quantum algorithms 146 may comprise a quantum optimization algorithm. The resource balancing system 128 deploys the improved memory configuration 156 to the micro applications server 104 and restarts the micro applications server 104.

The resource balancing system 128 determines if the memory reallocation process is successful. In response to determining that the memory reallocation process is not successful, the resource balancing system 128 sends an instruction 176 to the load balancing system 162 to deploy the standard memory configuration 172 to the micro applications server 104 and restarts the micro applications server 104.

In response to determining that the memory reallocation process is successful, the resource balancing system 128 stores the improved memory configuration 156 along with the corresponding score 150 in the resource balancing system 128 and determines if an instruction 178 to stop the memory allocation process is received. In certain embodiments, the resource balancing system 128 performs the above-described operations of the memory allocation process one or more times until the instruction 178 to stop the memory allocation process is received.

System Components

Network

Network 102 may be any suitable type of wireless and/or wired network. The network 102 may or may not be connected to the Internet or public network. The network 102 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMax, etc.), a long-term evolution (LTE) network, a universal mobile telecommunications system (UMTS) network, a peer-to-peer (P2P) network, a Bluetooth network, a near field communication (NFC) network, and/or any other suitable network. The network 102 may be configured to support any suitable type of communication protocol as would be appreciated by one of ordinary skill in the art.

Micro Applications Server

The micro applications server 104 comprises a plurality of nodes 106-1 through **106-*m*. Each of the nodes 106-1 through 106-*m* is generally any device that is configured to process data and communicate with other components of the system 100 via the network 102. Each of the nodes 106-1 through 106-*m* comprises a respective one of processors 108-1 through 108-*m* in signal communication with a respective one of memories 112-1 through 112-*m* and a respective one of network interfaces 110-1 through 110-*m***.

Each of the processors 108-1 through **108-*m* comprises one or more processors operably coupled to a respective one of the memories 112-1 through 112-*m*. Each of the processors 108-1 through 108-*m* is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). Each of the processors 108-1 through 108-*m* may be a programmable logic device, a microcontroller, a microprocessor, or any suitable combination of the preceding. The one or more processors are configured to process data and may be implemented in hardware or software. For example, each of the processors 108-1 through 108-*m* may be 8-bit, 16-bit, 32-bit, 64-bit, or of any other suitable architecture. The one or more processors are configured to implement various software instructions to perform the operations described herein. For example, the one or more processors are configured to execute a respective one of micro applications 114-1 through 114-*m* and perform one or more functions of the micro applications server 104. The processors 108-1 through 108-*m*** may be also referred to as classical processors.

Each of network interfaces 110-1 through **110-*m* is configured to enable wired and/or wireless communications (e.g., via network 102). Each of network interfaces 110-1 through 110-*m* is configured to communicate data between the micro applications server 104 and other components of the system 100. For example, each of network interfaces 110-1 through 110-*m* may comprise a WIFI interface, a local area network (LAN) interface, a wide area network (WAN) interface, a modem, a switch, or a router. Each of processors 108-1 through 108-*m* is configured to send and receive data using a respective one of network interfaces 110-1 through 110-*m*. Each of network interfaces 110-1 through 110-*m*** may be configured to use any suitable type of communication protocol as would be appreciated by one of ordinary skill in the art.

Each of memories 112-1 through **112-*m* comprises a non-transitory computer-readable medium such as one or more disks, tape drives, or solid-state drives, and may be used as an over-flow data storage device, to store programs when such programs are selected for execution, and to store instructions and data that are read during program execution. Each of memories 112-1 through 112-*m* may be volatile or non-volatile and may comprise a read-only memory (ROM), random-access memory (RAM), ternary content-addressable memory (TCAM), dynamic random-access memory (DRAM), and static random-access memory (SRAM). Each of memories 112-1 through 112-*m* may be implemented using one or more disks, tape drives, solid-state drives, and/or the like. The memories 112-1 through 112-*m* may store any of the information described in FIGS. 1, 2A and 2B along with any other data, instructions, logic, rules, or code operable to implement the function(s) described herein. Each of memories 112-1 through 112-*m* is operable to store a respective one of micro applications 114-1 through 114-*m*, and/or any other data and instructions. The micro applications 114-1 through 114-*m* may comprise any suitable set of software instructions, logic, rules, or code operable to be executed by processors 108-1 through 108-*m***, respectively.

In operation, in certain embodiments, the micro applications server 104 is configured to receive an improved memory configuration 156 from the resource balancing system 128. In other embodiments, the micro applications server 104 is configured to receive a standard memory configuration 172 from the load balancing system 162. The micro applications server 104 is further configured to receive an instruction 174 that instructs the micro applications server 104 to restart some or all of the nodes 106-1 through **106-*m***.

Monitoring System

The monitoring system 116 is generally any device that is configured to process data and communicate with other components of the system 100 via the network 102. The monitoring system 116 may comprise a processor 118 in signal communication with a memory 122 and a network interface 120.

Processor 118 comprises one or more processors operably coupled to the memory 122. Processor 118 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). Processor 118 may be a programmable logic device, a microcontroller, a microprocessor, or any suitable combination of the preceding. The one or more processors are configured to process data and may be implemented in hardware or software. For example, processor 118 may be 8-bit, 16-bit, 32-bit, 64-bit, or of any other suitable architecture. The one or more processors are configured to implement various software instructions to perform the operations described herein. For example, the one or more processors are configured to execute software instructions 170 and perform one or more functions described herein.

Network interface 120 is configured to enable wired and/or wireless communications (e.g., via network 102). Network interface 120 is configured to communicate data between the monitoring system 116 and other components of the system 100. For example, the network interface 120 may comprise a WIFI interface, a local area network (LAN) interface, a wide area network (WAN) interface, a modem, a switch, or a router. Processor 118 is configured to send and receive data using the network interface 120. Network interface 120 may be configured to use any suitable type of communication protocol as would be appreciated by one of ordinary skill in the art.

Memory 122 comprises a non-transitory computer-readable medium such as one or more disks, tape drives, or solid-state drives, and may be used as an over-flow data storage device, to store programs when such programs are selected for execution, and to store instructions and data that are read during program execution. Memory 122 may be volatile or non-volatile and may comprise a read-only memory (ROM), random-access memory (RAM), ternary content-addressable memory (TCAM), dynamic random-access memory (DRAM), and static random-access memory (SRAM). Memory 122 may be implemented using one or more disks, tape drives, solid-state drives, and/or the like. Memory 122 may store any of the information described in FIGS. 1, 2A and 2B along with any other data, instructions, logic, rules, or code operable to implement the function(s) described herein. Memory 122 is operable to store software instructions 124, and/or any other data and instructions. The software instructions 124 may comprise any suitable set of software instructions, logic, rules, or code operable to be executed by the processor 118. Memory 122 may further store logs 126 for the micro applications server 104. The logs 126 comprise information about usage of the micro applications 114-1 through **114-*m* hosted by the micro applications server 104**.

In operation, the processor 118 of the monitoring system 116 is configured to various performance parameters of the micro applications 114-1 through **114-*m* hosted by the micro applications server 104. The performance parameters may comprise a resource usage, a cache size, average memory hits, a database memory size, and the like. The processor 118 of the monitoring system 116 is further configured to generate logs 126 for the micro applications server 104 based on the monitored performance parameters and send the logs 126 to the resource balancing system 128. In certain embodiments, the logs 126** comprise values of monitored performance parameters.

Resource Balancing System

The resource balancing system 128 is generally any device that is configured to process data and communicate with other components of the system 100 via the network 102. The resource balancing system 128 may comprise a classical processor 130, a quantum processor 132, and a converter 136 in signal communication with a memory 140 and a network interface 134. Classical processor 130 comprises one or more processors operably coupled to the memory 140. Classical processor 130 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). Classical processor 130 may be a programmable logic device, a microcontroller, a microprocessor, or any suitable combination of the preceding. The one or more processors are configured to process data and may be implemented in hardware or software. For example, classical processor 130 may be 8-bit, 16-bit, 32-bit, 64-bit, or of any other suitable architecture. The one or more processors are configured to implement various software instructions to perform the operations described herein. For example, the one or more processors are configured to execute software instructions 142 and/or the one or more classical algorithms 144, and perform one or more functions described herein.

Quantum processor 132 may comprise one or more quantum processors operably coupled to the memory 140. Quantum processor 132 is configured to process quantum bits. Quantum processor 132 may comprise a superconducting quantum device (with qubits implemented by states of Josephson junctions), a trapped ion device (with qubits implemented by internal states of trapped ions), a trapped neutral atom device (with qubits implemented by internal states of trapped neutral atoms), a photon-based device (with qubits implemented by modes of photons), or any other suitable device that implements quantum bits with states of a respective quantum system. Quantum processor 132 is configured to execute one or more quantum algorithms 146 to perform one or more functions described herein.

Converter 136 is configured to convert data items represented by classical binary bits to quantum bits. Converter 136 is further configured to convert data items represented by quantum bits to classical binary bits. In certain embodiments, the converter 136 comprises a plurality of components 138 that are configured to generate and manipulate quantum bits. In the illustrated embodiment, the plurality of components 138 and the quantum processor 132 are configured to operate on a same type of quantum bits. For example, when the quantum processor 132 comprises a photon-based device (with qubits implemented by modes of photons), the plurality of components 138 may comprise optical components such as lasers, mirrors, prisms, waveguides, interferometers, optical fibers, filters, polarizers, and/or lenses.

Network interface 134 is configured to enable wired and/or wireless communications (e.g., via network 102). Network interface 134 is configured to communicate data between the resource balancing system 128 and other components of the system 100. For example, the network interface 134 may comprise a WIFI interface, a local area network (LAN) interface, a wide area network (WAN) interface, a modem, a switch, or a router. The classical processor 130 and the quantum processor 132 are configured to send and receive data using the network interface 134. Network interface 134 may be configured to use any suitable type of communication protocol as would be appreciated by one of ordinary skill in the art.

Memory 140 comprises a non-transitory computer-readable medium such as one or more disks, tape drives, or solid-state drives, and may be used as an over-flow data storage device, to store programs when such programs are selected for execution, and to store instructions and data that are read during program execution. Memory 140 may be volatile or non-volatile and may comprise a read-only memory (ROM), random-access memory (RAM), ternary content-addressable memory (TCAM), dynamic random-access memory (DRAM), and static random-access memory (SRAM). Memory 140 may be implemented using one or more disks, tape drives, solid-state drives, and/or the like. Memory 140 may store any of the information described in FIGS. 1, 2A and 2B along with any other data, instructions, logic, rules, or code operable to implement the function(s) described herein. Memory 140 is operable to store software instructions 142, the one or more classical algorithms 144, the one or more quantum algorithms 146, and/or any other data and instructions. The software instructions 142 and the one or more classical algorithms 144 may comprise any suitable set of software instructions, logic, rules, or code operable to be executed by the classical processor 130. In certain embodiments, the one or more classical algorithms 144 comprise a random forest algorithm. The one or more quantum algorithms 146 may comprise any suitable set of software instructions, logic, rules, or code operable to be executed by the quantum processor 132. In certain embodiments, the one or more quantum algorithms 146 may comprise a quantum optimization algorithm.

Memory 140 may be further configured to store historical logs 148 for the micro applications server 104. In certain embodiments when the one or more classical algorithms comprise a random forest algorithm, the historical logs 148 may be used as training data for training the random forest algorithm. Memory 140 may further store scores 158 and respective memory configurations 160. Each memory configuration 160 determines a respective memory allocation for micro applications 114-1 through **114-*m* hosted by the micro applications server 104**.

In operation, the classical processor 130 of the resource balancing system 128 receives logs 126 for the micro applications server 104 from the monitoring system 116. In certain embodiments, the logs 126 comprise values of monitored performance parameters. The performance parameters may comprise a resource usage, a cache size, average memory hits, a database memory size, and the like. The classical processor 130 of the resource balancing system 128 determines a score 150 based on the received logs 126. In certain embodiments, the score 150 may be used to determine if memory reallocation is needed for the micro applications 114-1 through **114-*m* hosted by the micro applications server 104. The classical processor 130 of the resource balancing system 128 compares the score 150 to a score threshold 152 that is stored in a memory 140 of the resource balancing system 128 and determines if memory reallocation is needed for the micro applications 114-1 through 114-*m* hosted by the micro applications server 104. The classical processor 130 of the resource balancing system 128 may determine that memory reallocation is needed for the micro applications 114-1 through 114-*m* hosted by the micro applications server 104 when the score 150 is less than the score threshold 152. The classical processor 130 of the resource balancing system 128 may determine that memory reallocation is not needed for the micro applications 114-1 through 114-*m* hosted by the micro applications server 104 when the score 150 is greater than or equal to the score threshold 152**.

In response to determining at operation 212 that the memory reallocation is not needed, the classical processor 130 of the resource balancing system 128 determines if an instruction 178 to stop the memory allocation process is received.

In response to determining that the memory reallocation is needed, the classical processor 130 of the resource balancing system 128 compares the score 150 to a plurality of scores 158 that are stored in the memory 140 of the resource balancing system 128 and determines if the score 150 matches with a store score among the plurality of stored scores 158.

In response to determining that the score 150 matches with the stored score 158, the classical processor 130 of the resource balancing system 128 identifies a memory configuration corresponding to the stored score 158 among a plurality of memory configurations 160 that are stored in the memory 140 of the resource balancing system 128. The classical processor 130 of the resource balancing system 128 deploys the identified stored memory configuration 160 to the micro applications server 104 and restarts the micro applications server 104. In certain embodiments, the classical processor 130 of the resource balancing system 128 sends an instruction 174 to the micro applications server 104 that instructs the micro applications server 104 to restart some or all of the nodes 106-1 through **106-*m* of the micro applications server 104**.

In response to determining that the score 150 does not match with the stored score 158, the classical processor 130 of the resource balancing system 128 determines a predicted memory configuration 154 based on the score 150. In certain embodiments, the classical processor 130 of the resource balancing system 128 executes one or more classical algorithms 144 while determining the predicted memory configuration 154. The one or more classical algorithms 144 may comprise a random forest algorithm.

The converter 136 of the resource balancing system 128 receives the predicted memory configuration 154 from the classical processor 130 of the resource balancing system 128, converts the predicted memory configuration 154 from classical bits to quantum bits, and sends the predicted memory configuration 154 converted to quantum bits to a quantum processor 132 of the resource balancing system 128. The quantum processor 132 of the resource balancing system 128 determines an improved memory configuration 156 based on the predicted memory configuration 154. In certain embodiments, the quantum processor 132 of the resource balancing system 128 executes one or more quantum algorithms 146 while determining the improved memory configuration 156. The one or more quantum algorithms 146 may comprise a quantum optimization algorithm.

The converter 136 of the resource balancing system 128 receives the improved memory configuration 156 from the quantum processor 132 of the resource balancing system 128, converts the improved memory configuration 156 from quantum bits to classical bits, and sends the improved memory configuration 156 converted to classical bits to the classical processor 130 of the resource balancing system 128. The classical processor 130 of the resource balancing system 128 deploys the improved memory configuration 156 to the micro applications server 104 and restarts the micro applications server 104. In certain embodiments, the classical processor 130 of the resource balancing system 128 sends an instruction 174 to the micro applications server 104 that instructs the micro applications server 104 to restart some or all of the nodes 106-1 through **106-*m* of the micro applications server 104**.

The classical processor 130 of the resource balancing system 128 determines if the memory reallocation process is successful. In response to determining that the memory reallocation process is not successful, the classical processor 130 of the resource balancing system 128 deploys a standard memory configuration 172 to the micro applications server 104. In certain embodiments, the classical processor 130 of the resource balancing system 128 sends an instruction 176 to a load balancing system 162 to deploy the standard memory configuration 172. The classical processor 130 of the resource balancing system 128 restarts the micro applications server 104. In certain embodiments, the classical processor 130 of the resource balancing system 128 sends an instruction 174 to the micro applications server 104 that instructs the micro applications server 104 to restart some or all of the nodes 106-1 through **106-*m*. The classical processor 130 of the resource balancing system 128 determines if an instruction 178** to stop the memory allocation process is received.

In response to determining that the memory reallocation process is successful, the classical processor 130 of the resource balancing system 128 stores the improved memory configuration 156 along with the corresponding score 150 in the memory 140 of the resource balancing system 128 and determines if an instruction 178 to stop the memory allocation process is received. In certain embodiments, the above-described operations of the memory allocation process are performed one or more times until the instruction 178 to stop the memory allocation process is received.

Load Balancing System

The load balancing system 162 is generally any device that is configured to process data and communicate with other components of the system 100 via the network 102. The load balancing system 162 may comprise a processor 164 in signal communication with a memory 168 and a network interface 166.

Processor 164 comprises one or more processors operably coupled to the memory 168. Processor 164 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). Processor 164 may be a programmable logic device, a microcontroller, a microprocessor, or any suitable combination of the preceding. The one or more processors are configured to process data and may be implemented in hardware or software. For example, processor 164 may be 8-bit, 16-bit, 32-bit, 64-bit, or of any other suitable architecture. The one or more processors are configured to implement various software instructions to perform the operations described herein. For example, the one or more processors are configured to execute software instructions 170 and perform one or more functions described herein.

Network interface 166 is configured to enable wired and/or wireless communications (e.g., via network 102). Network interface 166 is configured to communicate data between the load balancing system 162 and other components of the system 100. For example, the network interface 166 may comprise a WIFI interface, a local area network (LAN) interface, a wide area network (WAN) interface, a modem, a switch, or a router. Processor 164 is configured to send and receive data using the network interface 166. Network interface 166 may be configured to use any suitable type of communication protocol as would be appreciated by one of ordinary skill in the art.

Memory 168 comprises a non-transitory computer-readable medium such as one or more disks, tape drives, or solid-state drives, and may be used as an over-flow data storage device, to store programs when such programs are selected for execution, and to store instructions and data that are read during program execution. Memory 168 may be volatile or non-volatile and may comprise a read-only memory (ROM), random-access memory (RAM), ternary content-addressable memory (TCAM), dynamic random-access memory (DRAM), and static random-access memory (SRAM). Memory 168 may be implemented using one or more disks, tape drives, solid-state drives, and/or the like. Memory 168 may store any of the information described in FIGS. 1, 2A and 2B along with any other data, instructions, logic, rules, or code operable to implement the function(s) described herein. Memory 168 is operable to store software instructions 170, and/or any other data and instructions. The software instructions 170 may comprise any suitable set of software instructions, logic, rules, or code operable to be executed by the processor 164. Memory 168 may further store a standard memory configuration 172 for the micro applications server 104. The standard memory configuration 172 may comprise memory configurations for micro applications 114-1 through and **114-*m* of the nodes 106-1 through and 106-*m***.

In operation, the processor 164 of the load balancing system 162 is configured to receive an instruction 176 from the resource balancing system 128 to deploy the standard memory configuration 172 to the micro applications server 104. The processor 164 of the load balancing system 162 is further configured to deploy the standard memory configuration 172 to the micro applications server 104 in response to receiving the instruction 176 from the resource balancing system 128.

Example Method for Memory Reallocation for Micro Applications Using Quantum Computing FIGS. 2A and 2B illustrate an example flowchart of a method 200 for memory reallocation for micro applications using quantum computing. Modifications, additions, or omissions may be made to method 200. Method 200 may include more, fewer, or other operations. For example, operations may be performed in parallel or in any suitable order. For example, one or more operations of method 200 may be implemented, at least in part, in the form of the software instructions (e.g., instructions 124, 142, 170, one or more classical algorithms 144, and/or one or more quantum algorithms 146 of FIG. 1), stored on non-transitory, tangible, computer-readable medium (e.g., memories 122, 140, and/or 168 of FIG. 1) that when executed by one or more processors (e.g., processors 118, 130, 132 and/or 164 of FIG. 1) may cause the one or more processors to perform operations 202-238.

Method 200 starts with operation 202, where a processor 118 of a monitoring system 116 monitors a micro applications server 104. In certain embodiments, the monitoring system 116 may monitor various performance parameters of the micro applications 114-1 through **114-*m* hosted by the micro applications server 104**. The performance parameters may comprise a resource usage, a cache size, average memory hits, a database memory size, and the like.

At operation 204, the processor 118 of the monitoring system 116 generates logs 126 for the micro applications server 104 based on the monitored performance parameters. In certain embodiments, the logs 126 comprise values of monitored performance parameters.

At operation 206, a classical processor 130 of a resource balancing system 128 receives the logs 126 for the micro applications server 104 from the monitoring system 116.

At operation 208, the classical processor 130 of the resource balancing system 128 determines a score 150 based on the received logs 126. In certain embodiments, the score 150 may be used to determine if memory reallocation is needed for the micro applications 114-1 through **114-*m* hosted by the micro applications server 104**.

At operation 210, the classical processor 130 of the resource balancing system 128 compares the score 150 to a score threshold 152 that is stored in a memory 140 of the resource balancing system 128.

At operation 212, the classical processor 130 of the resource balancing system 128 determines if memory reallocation is needed for the micro applications 114-1 through **114-*m* hosted by the micro applications server 104. The classical processor 130 of the resource balancing system 128 may determine that memory reallocation is needed for the micro applications 114-1 through 114-*m* hosted by the micro applications server 104 when the score 150 is less than the score threshold 152. The classical processor 130 of the resource balancing system 128 may determine that memory reallocation is not needed for the micro applications 114-1 through 114-*m* hosted by the micro applications server 104 when the score 150 is greater than or equal to the score threshold 152**.

In response to determining at operation 212 that the memory reallocation is needed, method 200 continues to operation 214. At operation 214, the classical processor 130 of the resource balancing system 128 compares the score 150 to a plurality of scores 158 that are stored in the memory 140 of the resource balancing system 128.

At operation 216, the classical processor 130 of the resource balancing system 128 determines if the score 150 matches with a store score among the plurality of stored scores 158.

In response to determining at operation 216 that the score 150 matches with the stored score 158, method 200 continues to operation 218. At operation 218, the classical processor 130 of the resource balancing system 128 identifies a memory configuration corresponding to the stored score 158 among a plurality of memory configurations 160 that are stored in the memory 140 of the resource balancing system 128.

At operation 220, the classical processor 130 of the resource balancing system 128 deploys the identified stored memory configuration 160 to the micro applications server 104. After performing operation 220, method 200 continues to operation 228.

In response to determining at operation 216 that the score 150 does not match with the stored score 158, method 200 continues to operation 222. At operation 222, the classical processor 130 of the resource balancing system 128 determines a predicted memory configuration 154 based on the score 150. In certain embodiments, the classical processor 130 of the resource balancing system 128 executes one or more classical algorithms 144 while determining the predicted memory configuration 154. The one or more classical algorithms 144 may comprise a random forest algorithm.

At operation 224, a converter 136 of the resource balancing system 128 receives the predicted memory configuration 154 from the classical processor 130 of the resource balancing system 128, converts the predicted memory configuration 154 from classical bits to quantum bits, and sends the predicted memory configuration 154 converted to quantum bits to a quantum processor 132 of the resource balancing system 128. The quantum processor 132 of the resource balancing system 128 determines an improved memory configuration 156 based on the predicted memory configuration 154. In certain embodiments, the quantum processor 132 of the resource balancing system 128 executes one or more quantum algorithms 146 while determining the improved memory configuration 156. The one or more quantum algorithms 146 may comprise a quantum optimization algorithm.

At operation 226, the converter 136 of the resource balancing system 128 receives the improved memory configuration 156 from the quantum processor 132 of the resource balancing system 128, converts the improved memory configuration 156 from quantum bits to classical bits, and sends the improved memory configuration 156 converted to classical bits to the classical processor 130 of the resource balancing system 128. The classical processor 130 of the resource balancing system 128 deploys the improved memory configuration 156 to the micro applications server 104.

After performing operations 220 or 226, method 200 continues to operation 228. At operation 228, the classical processor 130 of the resource balancing system 128 restarts the micro applications server 104. In certain embodiments, the classical processor 130 of the resource balancing system 128 sends an instruction 174 to the micro applications server 104 that instructs the micro applications server 104 to restart some or all of the nodes 106-1 through **106-*m***.

At operation 230, the classical processor 130 of the resource balancing system 128 determines if the memory reallocation process is successful.

In response to determining at operation 230 that the memory reallocation process is not successful, method 200 continues to operation 232. At operation 232, the classical processor 130 of the resource balancing system 128 deploys a standard memory configuration 172 to the micro applications server 104. In certain embodiments, the classical processor 130 of the resource balancing system 128 sends an instruction 176 to a load balancing system 162 to deploy the standard memory configuration 172. In response to receiving the instruction 176, the load balancing system 162 deploys the standard memory configuration 172 to the micro applications server 104.

At operation 234, the classical processor 130 of the resource balancing system 128 restarts the micro applications server 104. In certain embodiments, the classical processor 130 of the resource balancing system 128 sends an instruction 174 to the micro applications server 104 that instructs the micro applications server 104 to restart some or all of the nodes 106-1 through **106-*m*. After performing operation 234, method 200 continues to operation 238**.

In response to determining at operation 230 that the memory reallocation process is successful, method 200 continues to operation 236. At operation 236, the classical processor 130 of the resource balancing system 128 stores the improved memory configuration 156 along with the corresponding score 150 in the memory 140 of the resource balancing system 128.

In response to determining at operation 212 that the memory reallocation is not needed or after performing operations 234 or 236, method 200 continues to operation 238. At operation 238, the classical processor 130 of the resource balancing system 128 determines if an instruction 178 to stop the memory allocation process is received.

In response to determining at operation 238 that the instruction 178 to stop the memory allocation process is not received, method 200 goes back to operation 202. In certain embodiments, operations 202 through 238 are performed one or more times until the instruction 178 to stop the memory allocation process is received. In response to determining at operation 238 that the instruction 178 to stop the memory allocation process is received, method 200 ends.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112 (f) as it exists on the date of filing hereof unless the words "means for" or "step for" are explicitly used in the particular claim.

The invention claimed is:

1. A system comprising:

a resource balancing system communicatively coupled to a micro applications server, wherein the resource balancing system comprises:

a memory configured to store:

a quantum optimization algorithm;

a plurality of scores;

a plurality of memory configurations corresponding to the plurality of scores, each memory configuration determining a respective memory allocation for micro applications hosted by the micro applications server; and a score threshold; and a classical processor communicatively coupled to the memory, wherein the classical processor is configured to:

receive logs for the micro applications server;

determine a first score based on the received logs;

compare the first score to the score threshold; and in response to determining that memory reallocation is needed:

compare the first score to the plurality of scores; and in response to the first score not matching any of the plurality of scores:

determine a predicted memory configuration based on the first score;

send the predicted memory configuration to a quantum processor; and in response to sending the predicted memory configuration:

receive an improved memory configuration from the quantum processor;

deploy the improved memory configuration to the micro applications server; and restart the micro applications server; and the quantum processor communicatively coupled to the memory, the quantum processor implementing the quantum optimization algorithm, wherein the quantum processor is configured to:

receive the predicted memory configuration from the classical processor;

determine the improved memory configuration based on the predicted memory configuration; and send the improved memory configuration to the classical processor.

2. The system of claim 1, wherein the classical processor is further configured to:

in response to the first score matching a second score of the plurality of scores:

identify a memory configuration that corresponds to the second score among the plurality of memory configurations;

deploy the identified memory configuration to the micro applications server; and restart the micro applications server.

3. The system of claim 1, further comprising a load balancing system communicatively coupled to the micro applications server and resource balancing system, wherein the load balancing system comprises a second classical processor, and wherein the second classical processor is configured to, in response to determining that a memory allocation process failed:

deploy a standard memory configuration to the micro applications server; and restart the micro applications server.

4. The system of claim 1, wherein the logs comprise values of performance parameters for the micro applications hosted by the micro applications server.

5. The system of claim 1, wherein the classical processor is further configured to, in response to determining that a memory allocation process is successful, store the improved memory configuration and the first score in the memory.

6. The system of claim 1, wherein determining the predicted memory configuration comprises executing a random forest algorithm.

7. The system of claim 1, further comprising a monitoring system communicatively coupled to the micro applications server and resource balancing system, wherein the monitoring system comprises a third classical processor, and wherein the third classical processor is configured to:

monitor the micro applications server; and generate the logs.

8. A method comprising:

receiving logs for a micro applications server;

determining a first score based on the received logs;

comparing the first score to a score threshold; and in response to determining that memory reallocation is needed:

comparing the first score to a plurality of scores; and in response to the first score not matching any of the plurality of scores:

determining a predicted memory configuration based on the first score;

determining an improved memory configuration based on the predicted memory configuration, wherein the improved memory configuration determines a respective memory allocation for micro applications hosted by the micro applications server;

deploying the improved memory configuration to the micro applications server; and restarting the micro applications server.

9. The method of claim 8, further comprising, in response to the first score matching a second score of the plurality of scores:

identifying a memory configuration that corresponds to the second score among a plurality of memory configurations;

deploying the identified memory configuration to the micro applications server; and restarting the micro applications server.

10. The method of claim 8, further comprising, in response to determining that a memory allocation process failed:

deploying a standard memory configuration to the micro applications server; and restarting the micro applications server.

11. The method of claim 8, wherein determining the improved memory configuration comprises executing a quantum optimization algorithm.

12. The method of claim 8, further comprising, in response to determining that a memory allocation process is successful, storing the improved memory configuration and the first score.

13. The method of claim 8, wherein determining the predicted memory configuration comprises executing a random forest algorithm.

14. The method of claim 8, further comprising:

monitoring the micro applications server; and generating the logs.

15. A non-transitory computer-readable medium storing instructions that, when executed by at least one of a classical processor or a quantum processor, cause the at least one of the classical processor or the quantum processor to:

receive logs for a micro applications server;

determine a first score based on the received logs;

compare the first score to a score threshold; and in response to determining that memory reallocation is needed:

compare the first score to a plurality of scores; and in response to the first score not matching any of the plurality of scores:

determine a predicted memory configuration based on the first score;

determine an improved memory configuration based on the predicted memory configuration, wherein the improved memory configuration determines a respective memory allocation for micro applications hosted by the micro applications server;

deploy the improved memory configuration to the micro applications server; and restart the micro applications server.

16. The non-transitory computer-readable medium of claim 15, wherein the instructions, when executed by the at least one of the classical processor or the quantum processor, further cause the at least one of the classical processor or the quantum processor to, in response to the first score matching a second score of the plurality of scores:

identify a memory configuration that corresponds to the second score among a plurality of memory configurations;

deploy the identified memory configuration to the micro applications server; and restart the micro applications server.

17. The non-transitory computer-readable medium of claim 15, wherein the instructions, when executed by the at least one of the classical processor or the quantum processor, further cause the at least one of the classical processor or the quantum processor to, in response to determining that a memory allocation process failed:

deploy a standard memory configuration to the micro applications server; and restart the micro applications server.

18. The non-transitory computer-readable medium of claim 15, wherein determining the improved memory configuration comprises executing a quantum optimization algorithm.

19. The non-transitory computer-readable medium of claim 15, wherein the instructions, when executed by the at least one of the classical processor or the quantum processor, further cause the at least one of the classical processor or the quantum processor to, in response to determining that a memory allocation process is successful, store the improved memory configuration and the first score.

20. The non-transitory computer-readable medium of claim 15, wherein determining the predicted memory configuration comprises executing a random forest algorithm.

* * * * *